United States Patent [19]

Perronin et al.

[11] 4,302,366
[45] Nov. 24, 1981

[54] FLUORINATED PRODUCTS INTENDED FOR OILPROOFING AND WATERPROOFING TREATMENTS OF VARIOUS MATERIALS AND MORE PARTICULARLY OF FIBROUS MATERIALS

[75] Inventors: Jean Perronin, Senlis; André L. Dessaint, Creil, both of France

[73] Assignee: Produits Chimiques Ugine Kuhlmann, Courbevoie, France

[21] Appl. No.: 90,224

[22] Filed: Nov. 1, 1979

[30] Foreign Application Priority Data

Nov. 14, 1978 [FR] France ................. 78 32087

[51] Int. Cl.³ ............... C14C 9/00; C07C 149/20; C07C 149/40; C09K 15/10
[52] U.S. Cl. .................... 252/8.57; 252/8.9; 252/395; 252/406; 560/15; 560/17; 560/154
[58] Field of Search ............... 427/388.1, 389.7, 384, 427/394, 395, 396, 397, 389, 391, 388.9, 393.4, 393, 393.6; 560/147, 152, 154, 250, 15, 17; 428/421; 252/8.57, 8.9, 395, 406

[56] References Cited

U.S. PATENT DOCUMENTS

| | | | |
|---|---|---|---|
| 3,819,666 | 6/1974 | Kleiner et al. | 560/152 X |
| 3,886,201 | 5/1975 | Falk et al. | 560/147 X |
| 3,935,277 | 1/1976 | Dear et al. | 560/152 X |
| 3,940,435 | 2/1976 | Hiestand | 560/152 X |
| 3,965,148 | 6/1976 | Kleiner et al. | 560/152 X |

*Primary Examiner*—Michael R. Lusignan
*Attorney, Agent, or Firm*—Beveridge, Degrandi, Kline & Lunsford

[57] ABSTRACT

The present invention relates to new fluorinated products resulting from the reaction of:

(a) one molecule of one or more acids of the formula:

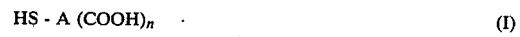

$$HS - A(COOH)_n \quad (I)$$

and of (b) one to five molecules of one or more compounds possessing at least one ethylenic bond, at least one of these compounds corresponding to the general formula:

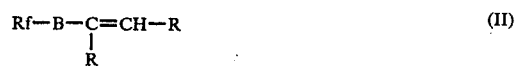

$$Rf-B-\underset{R}{\underset{|}{C}}=CH-R \quad (II)$$

and possibly neutralized or partially neutralized with an inorganic or organic base.

In the formulae (I) and (II), A represents an aliphatic or aromatic hydrocarbon radical, n is a whole number from 1 to 4, Rf represents a straight or branched perfluorinated chain containing 1 to 20 carbon atoms, B represents bivalent, possibly branched, chaining and may comprise sulfur, oxygen or nitrogen atoms, one of the symbols R represents a hydrogen atom and the other a hydrogen atom or an alkyl group containing 1 to 4 carbon atoms.

These products, applied to substrate materials, confer upon these an oilproofing and waterproofing effect as well as a resistance to aggressive products or solvents.

54 Claims, No Drawings

FLUORINATED PRODUCTS INTENDED FOR OILPROOFING AND WATERPROOFING TREATMENTS OF VARIOUS MATERIALS AND MORE PARTICULARLY OF FIBROUS MATERIALS

The present invention relates to new fluorinated products, their manufacture and their application in the oilproofing and waterproofing treatment of the most varied materials such as textiles, non-woven fabrics, leather, wood, metals, concrete and more particularly paper, cardboards and similar materials.

The oilproofing and waterproofing treatment, by conferring to these materials repellent properties towards certain substances, permits a reduction, for example, of the penetration of oils, fats and of certain organic solvents, imparts to these materials anti-adhesive qualities and/or permits the realization of protective coatings. This surface characteristic may be made use of for conferring upon these materials antistatic properties, greater facility for cleaning or a certain resistance towards corrosion and towards chemical or atmospheric attack.

To obtain these characteristics certain fluorinated derivatives have already been proposed, for example in French Pat. Nos. 2,155,133, corresponding to U.S. Pat. No. 3,870,767, and 2,175,332, corresponding to U.S. Pat. No. 4,032,495, and French patent application Nos. 75 23898 and 75 31794, the latter corresponding to U.S. Ser. No. 727,497 filed Sept. 28, 1976, filed by the assignee of the applicants. However, is has been found that the majority of these products, although possessing interesting properties on textiles and on leather, require for their application to paper or cardboard either the use of an excessive rate of active substances (in this instance the rate of fluorine bonded to carbon) to obtain economically acceptable performances, or else conditions of application or heat treatment which are not fully compatible with those normally used in the paper and cardboard industry.

Fluorinated derivatives on a chromium complex basis and soluble in water, which are more especially adapted to paper, have been proposed in French Pat. Nos. 1,172,664 and 2,022,351 and U.S. Pat. No. 3,907,576. These products effectively impart interesting oleophobic properties to papers and cardboards, but they have the disadvantage of being green in color and transmitting this color to the materials so treated.

Other uncolored fluorinated derivatives generally comprising phosphoro, amido or amino terminal groups have been proposed for use on paper in French Pat. Nos. 1,305,612; 1,388,621; 2,055,551; 2,057,793; 2,014,893; 2,037,675 and 2,038,912 and U.S. Pat. No. 3,817,958. Unfortunately, these products require high doses of fluorine to provide good performances and they are often very sensitive to the polyvalent cations frequently used in the treatment of pulps and of the papers themselves. Moreover, they are only slightly soluble or insoluble in water, do not sufficiently resist folding and calendering and also have the disadvantage of imparting to the papers excessive hydrophilic properties which reduce the effectiveness of sizing agents and consequently diminish the rate of sizing and even the suitability for writing and printing.

New fluorinated products have now been discovered which on application to various bases and more particularly to papers and cardboards impart to these, at a low rate of fluorine deposit, a hydrophobic as well as oleophobic character, inasmuch as they oppose the spreading and the penetration of liquids of aqueous or oily origin, of fats, of a number of organic solvents and even of products of an acidic or basic character. Thanks to their good solubility these products can be applied readily in aqueous medium and in the presence of electrolytes. Finally, the papers and cardboards so treated preserve their performance on folding and calendering, they have a good sizing rate and are suitable for writing and printing.

The new fluorinated products in accordance with the invention result from the reaction of:

(a) one molecule of one or several acids of the formula:

$$HS-A-(COOH)_n \qquad (I)$$

and of (b) one to five molecules of one or several compounds having at least one ethylenic bond, at least one of these compounds corresponding to the formula:

$$Rf-B-\underset{R}{C}=CH-R \qquad (II)$$

and possibly a neutralization or a partial neutralization with an inorganic or organic base.

In the formulae (I) and (II), A represents an aliphatic or aromatic hydrocarbon radical, n is a whole number from 1 to 4, Rf represents a perfluorinated chain, straight or branched, containing 1 to 20, preferably 2 to 14 carbon atoms, B represents a bivalent, possibly branched, chaining and may comprise sulfur oxygen or nitrogen atoms, one of the symbols R represents a hydrogen atom and the other a hydrogen atom or an alkyl group containing 1 to 4 carbon atoms.

More particularly, A may represent an aliphatic hydrocarbon radical containing from 1 to 3 carbon atoms such as $-CH_2-$, $-CH_2-CH_2-$,

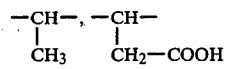

$$-\underset{CH_3}{\underset{|}{CH}}-, \quad -\underset{CH_2-COOH}{\underset{|}{CH}}-$$

or an aromatic hydrocarbon radical containing 6 carbon atoms such as

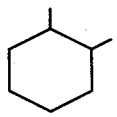

Examples of the perfluorinated chain Rf include $C_4F_9$, $C_6F_{13}$, $C_8F_{17}$, $C_{10}F_{21}$, $C_{12}F_{25}$, $C_{14}F_{29}$, and a mixture of $CF_3-(CF_2)_n-$ where n is 3, 5, 7, 9, and 11. Examples of the chaining B include:

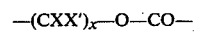

$-(CXX')_x-O-CO-$

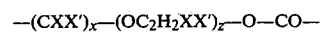

$-(CXX')_x-(OC_2H_2XX')_z-O-CO-$

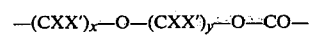

$-(CXX')_x-O-(CXX')_y-O-CO-$

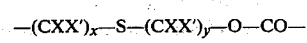

$-(CXX')_x-S-(CXX')_y-O-CO-$

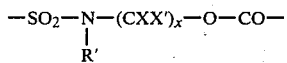

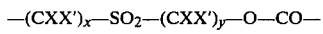

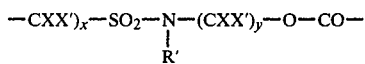

wherein x represents a whole number from 1 to 20, preferably equal to 2 or 4, y represents a whole number from 1 to 4, preferably equal to 1 or 2, R' represents a hydrogen atom or an alkyl group containing 1 to 10 carbon atoms, a cycloalkyl group containing 5 to 12 carbon atoms, a hydroxyalkyl group containing 2 to 4 carbon atoms or a aryl group which may be substituted by an alkyl radical containing 1 to 6 carbon atoms, X,X' may be identical or different and represent hydrogen atoms or alkyl groups containing 1 to 4 carbon atoms, and z a whole number from 1 to 10.

The products in accordance with the invention may be prepared by telomerization or cotelomerization in the presence or absence of a solvent medium, the acid defined under (a) playing the part of telogen and the ethylenic compounds defined under (b) playing the part of taxogen. It is possible to operate in the presence of ionic catalysts (cationic or anionic) such as boron trifluoride, aluminum chloride and sodium methylate, but preferably in the presence of a radical catalyst such as peroxygenated compounds like sodium, ammonium or potassium persulfate, the alkali perborates, hydrogen peroxide, tert.-butyl perborate, diacetyl peroxide, tert.-butyl perpivalate, peracetic acid, aminooxides, ceric and ammonium nitrate, azo compounds such as 2,2'-azo-bis-isobutyronitrile, 2,2'-azo-bis-(2,4-dimethyl 4-methoxy valeronitrile), 4,4'-azo-bis-(4-cyano pentanoic) acid or its alkali salts, azo-dicarbonamide, 2,2'-azo-diisobutylamidine dichlorohydrate or photoinitiators used in the presence of UV radiations such as the derivatives of benzoin, benzophenone, 2-methylanthraquinone and benzil. The quantity of catalyst to use may vary between 0.01 and 5% in relation to the weight of the ethylenic compounds employed and preferably between 0.1 and 1.5% thereof.

The products in accordance with the invention may also be prepared according to methods known in themselves, by condensation in the presence or absence of basic catalysts such as sodium, sodium methylate, sodium hydroxide or potassium hydroxide, piperidine, benzyltrimethylammonium hydroxide, pyridine, N-methylmorpholine, triethylene diamine and triethylamine.

The telomerization or condensation reactions are generally effected at a pH from 2 to 11 and at a temperature between 40° and 120° C., preferably between 50° and 90° C. It is possible, however, to work at higher or lower temperatures. For example, the use of redox catalysts, such as the persulfate-ferrous salt, persulfate-sodium hydroxy methane sulfinate, hydrogen peroxide-bisulfite, hydrogen peroxide-2,3-butanedione, tert.-butyl perpivalate-cobalt octoate, lauroyl peroxide-acetylacetone or benzoylperoxide-hydrazine systems may be useful for activating the reaction or lowering the temperature of telomerization. Finally, assuming the use of an adequate apparatus, the process may be carried out in a discontinuous, continuous or gradual manner.

In a general manner these different reactions are known and have been described, for example, in the following references, all of which are incorporated herein by reference.

"Monomeric Acrylic Esters" by H. Riddle, Reinhold Publishing Corp. (1965) pages 149 to 151.

G. Nagy "L'industrie chimique", No. 570, January 1965, pages 1 to 6.

R. B. Fox and DeField, U.S. Naval Research Laboratory, Washington, NRL Report 5190, Nov. 19, 1958.

M. S. Karasch and C. F. Focus, Journ. Org. Chem. 13, 1948, pages 97 to 100.

The acids defined above under (a) to be used for the preparation of products according to the invention may be an acid of formula (I), preferably thioglycollic acid, or a mixture of acids of formula (I). Equally interesting have proved acids such as 3-mercapto propionic acid, 4-mercapto butyric acid, thiolactic acid, thiomalic acid or thiosalicylic acid.

As polyfluorinated ethylenic compounds of formula (II) preferably those corresponding to the formula:

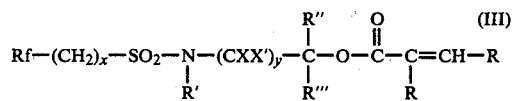

are used, wherein R and Rf are as defined above, x represents a whole number from 1 to 20, preferably equal to 2 or 4, y represents a whole number from 1 to 4, preferably equal to 1 or 2, R' represents a hydrogen atom or an alkyl group containing 1 to 10 carbon atoms, a cycloalkyl group containing 5 to 12 carbon atoms, a hydroxyalkyl group containing 2 to 4 carbon atoms or an aryl group which may be substituted by an alkyl radical containing 1 to 6 carbon atoms, R", R'", X and X' may be identical or different and represent hydrogen atoms or alkyl groups containing 1 to 4 carbon atoms.

These polyfluorinated monomers of formula (III) may be prepared according to known methods, for example by esterification of the corresponding alcohols of the formula:

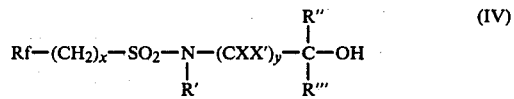

described in French Pat. No. 2,034,142, corresponding to U.S. Ser. No. 9,414, by means of an alkene monocarboxylic acid of the formula:

such as acrylic, methacrylic or crotonic acids in the presence of acid catalysts such as sulfuric acid or p-toluene sulfonic acid. It is also possible to use the anhydrides or halides of the acids of formula (V).

The following other examples of polyfluorinated ethylenic compounds of formula (II) may be mentioned:

(1) The esters of acids of formula (V) with the alcohols and thiols of the formulas:

$$Rf-OH \quad (VI)$$

$$Rf-(CXX')_x-OH \quad (VII)$$

$$Rf-(CXX')_x-(O-C_2H_2XX')_z-OH \quad (VIII)$$

$$Rf-(CXX')_x-O-(CXX')_y-OH \quad (IX)$$

$$Rf-(CXX')_x-S-(CXX')_y-OH \quad (X)$$

$$Rf-(CXX')_x-SH \quad (XI)$$

$$Rf-(CXX')_x-SO_2-(CXX')_y-OH \quad (XII)$$

$$Rf-SO_2-(CXX')_x-OH \quad (XIII)$$

$$Rf-CH=CH-CH_2-(O-C_2H_2XX')_z-OH \quad (XIV)$$

$$Rf-CH=CH-(CXX')_x-OH \quad (XV)$$

$$Rf-CF=CH-CH=CH-(O-C_2H_2XX')_z-OH \quad (XVI)$$

$$Rf-SO_2-N(R')-(CXX')_x-OH \quad (XVII)$$

$$Rf-SO_2-N(R')-(CXX')_x-C(R''')-OH \quad (XVIII)$$

$$Rf-CO_2-(CXX')_x-OH \quad (XIX)$$

$$Rf-CO-(CXX')_xOH \quad (XX)$$

$$Rf-CO-N(R')-(CXX')_x-OH \quad (XXI)$$

(2) The monomers of the formulas:

$$Rf-SO_2-(CXX')_x-C(R)=CH_2 \quad (XXII)$$

$$Rf-O-CH=CH_2 \quad (XXIII)$$

$$Rf-CO_2-(CXX')_x-C(R)=CH_2 \quad (XXIV)$$

$$Rf-(CH_2)_x-N(R')-CO-C(R)=CH_2 \quad (XXVI)$$

$$Rf-SO_2-N(R')-CO-C(R)=CH_2 \quad (XXVII)$$

$$Rf-CO-N(R')-CO-C(R)=CH_2 \quad (XXVIII)$$

$$Rf-CO-N(R')-(CXX')_x-N(R'')-CO-C(R)=CH_2 \quad (XXIX)$$

-continued $$Rf-CO-N(R')-C(R)=CH_2 \quad (XXX)$$

In the formulae (VI) to (XXX), x, y, Rf, R, R', R", R''', X, X', have the same significance as above and z is a whole number from 1 to 10.

As monomer or taxogen compounds, devoid of perfluorinated groups, which possess at least one ethylenic bond and may be used in a mixture with the compounds of formula (II) the following may be mentioned, by way of example:

1. The lower olefinic hydrocarbons, halogenated or not, such as ethylene, propylene, isobutene, 3-chloro-1-isobutene, butadiene, isoprene, chloro and dichloro butadienes, fluoro and difluoro butadienes, 2,5-dimethyl-1,5-hexadiene and diisobutylene;
2. The halides of vinyl, allyl or vinylidene such as vinyl or vinylidene chloride, vinyl or vinylidene fluoride, allyl bromide and methallyl chloride;
3. Styrene and its derivatives, such as vinyltoluene α-methyl-styrene, α-cyanomethylstyrene, divinylbenzene, N-vinylcarbazole;
4. Vinyl esters such as vinyl acetate, vinyl propionate, the vinyl esters of acids known in the trade under the name of "Versatic acids", vinyl isobutyrate, vinyl senecioate, vinyl succinate, vinyl stearate, divinyl carbonate and vinyl isodecanoate;
5. Allyl esters such as allyl acetate and allyl heptanoate;
6. Alkyl-vinyl ethers or alkyl-allyl ethers, halogenated or not, such as cetyl vinyl ether, dodecyl vinyl ether, isobutyl vinyl ether, ethyl vinyl ether, 2-chloro vinyl ether and tetraallyloxyethane;
7. Vinyl alkyl ketones such as vinyl methyl ketone;
8. Unsaturated acids, such as acrylic, methacrylic, α-chloro-acrylic, crotonic, maleic, fumaric, itaconic, citraconic and senecioc acids, their anhydrides and their esters such as vinyl, allyl, methyl, butyl, isobutyl, hexyl, heptyl, 2-ethyl hexyl, cyclohexyl, lauryl, stearyl or cellosolve acrylates and methacrylates, dimethyl maleate, ethyl crotonate, methyl acid maleate, butyl acid itaconate, glycol or polyalkene glycol diacrylates and dimethacrylates, such as ethylene glycol or triethylene glycol dimethacrylate, dichlorophosphato alkyl acrylates and methacrylates such as dichloro phosphato ethyl methacrylate and bis(methacryloyloxyethyl) acid phosphate; and
8. Acrylonitrile, methacrylonitrile, 2-chloro acrylonitrile, 2-cyano ethyl acrylate, methylene glutaronitrile, vinylidene cyanide, alkyl cyanoacrylates such as isopropyl cyanoacrylate, vinylpyrrolidone, tris-acryloyl hexahydro-s-triazine, vinyl trichlorosilane, vinyl trimethoxysilane, vinyl triethoxysilane.

It is also possible to use in a mixture with the compounds of formula (II) monomers or taxogens which possess at least one ethylenic bond and at least one reactive group, that is to say a group capable of reacting with another monomer or taxogen, another compound or the substrate material itself so as to establish cross-linkage. These reactive groups are well known and may be polar groups or functional groups, such as the OH, NH$_2$, NH-alkyl, COOMe (Me=alkali or alkaline earth metal), SO$_3$H,

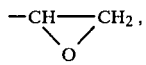

CHO,

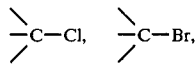

—SO$_2$—CH=CH$_2$, —NH—CO—CH=CH$_2$, etc. groups. As monomers of this type may be mentioned the hydroxyalkyl acrylates and methacrylates such as ethylene glycol monoacrylate, propylene glycol monomethacrylate, polyalkylene glycol acrylates and methacrylates; allyl alcohol, allyl glycolate, isobutene diol, allyloxy ethanol, o-allylphenol, divinyl carbinol, glycerol α allylether, acrylamide, methacrylamide, maleamide and maleimide, N-(cyanoethyl) acrylamide, N-isopropylacrylamide, diacetone acrylamide, N-(hydroxymethyl) acrylamide and methacrylamide, N-(alkoxymethyl) acrylamides and methacrylamides, glyoxal bis-acrylamide, sodium acrylate or methacrylate, vinyl sulfonic and styrene p-sulfonic acids and their alkali salts, 3-amino crotonitrile, monoallylamine, vinyl pyridines, glycidyl acrylate or methacrylate, allyl glycidyl ether, alkylaminoalkyl acrylates or methacrylates such as dimethylamino ethyl methacrylate and acrolein.

As basic agents intended partially or completely to neutralize the reaction products of the acids of formula (I) with the compounds of formula (II), inorganic or organic bases may be used such as ammonia, sodium hydroxide, calcium hydroxide, aluminum hydroxide or compounds such as triethylamine, morpholine, N-methyl morpholine, ethylenediamine, hydrazine, pyridine, picoline, or amino alcohols such as dimethylamino ethanol, 2-amino-2-methyl-1-propanol, mono and diethanolamines, N-substituted or not, and triethanolamine.

The new products in accordance with the invention may be prepared in the presence or absence of solvents. Some of the solvents that may be used are water, acetone, methyl ethyl ketone, methyl isobutyl ketone, γ-butyrolactone, methyl cyclohexanone, N-methyl 2-pyrrolidone, methanol, isopropanol, ethylene glycol, diacetone alcohol, phenyl methyl carbinol, isophorone, dialkyl and/or aryl ethers such as diisopropyl ether or anisol, tetrahydrofurane, dioxane, 1,2-dimethoxy ethane, acetic acid, lactic acid, ethylacetate, glycol acetate, glycol salicylate, dimethyl phthalate, ethylene or polyethylene glycol monomethyl or monoalkyl ether, ethylene or polyethylene glycol, dimethyl or dialkyl ether, ethylene glycol carbonate, formamide, dimethyl formamide, dimethyl acetamide, tetramethyl urea, N,N,N',N'-tetramethyl ethylenediamine, acetonitrile, butyronitrile, 3,3'-thio dipropionitrile, dimethylsulfoxide, sulfolane, hexamethyl phosphotriamide, N-oxide of pyridine, of 2-picoline or of trimethylamine, toluene, methyl cyclohexane, trifluoro toluene, trichloro trifluoro ethane, hexafluoro xylene, pyridine, nitromethane and caprolactam.

Although this is not essential, the new products in accordance with the invention may also be prepared in the presence of surface active agents which may be fluorinated or not, anionic, nonionic, cationic or amphoteric or a mixture of such agents. It is also possible to use colloids such as polyvinyl alcohol, carboxymethyl cellulose, methyl cellulose, hydroxyethyl cellulose, sodium alginate, acrylic or methacrylic polymers or copolymers and their water-soluble salts, copolymers of styrene-maleic anhydride, diisobutylene-maleic anhydride, ethylene-maleic anhydride, alkyl vinyl ether-maleic anhydride or their salts.

Finally it is possible to add other ingredients, well known in the technique of polymerization or of telomerization such as chelating agents, buffers, inorganic or organic acid salts, adjuvants capable of adjusting the pH and the molecular weight, hydrotropic agents, stabilizers, etc.

The products in accordance with the invention have very low degrees of polymerization and consequently relatively low molecular weights. They appear in general in the form of liquids, pastes or waxes and have no or little consistence. They may also appear in solution or not, in the form of a dispersion, or even in an emulsifiable or self-emulsifiable medium.

The proportion of dry substances of the new compositions in accordance with the invention may vary within very wide limits. It is advantageous, however, to use products the proportion of dry substances of which is comprised between 20 and 80% by weight.

As materials capable of being rendered oleophobic and hydrophobic by means of the products in accordance with the invention may be mentioned primarily papers, cardboards and similar materials. Other very diverse materials may also be mentioned such as, for example, woven and non-woven articles on the basis of cellulose or regenerated cellulose, natural fibers, artificial or synthetic fibers such as cotton, cellulose acetate, wool, silk, polyamide, polyester, polyolefin, polyurethane or polyacrylonitrile fibers, leather, plastics, glass, wood, metals, porcelain, stonework and painted surfaces.

In the case of papers and cardboards the products in accordance with the invention are applied in the form of solutions or dispersions, mainly in aqueous medium, but possibly in solvent medium or in a mixture of water and solvents, in accordance with known techniques, for example, by coating, impregnation, immersion, atomization, brushing, padding or couching. The articles so treated may be subjected to drying and possibly a heat treatment at a temperature comprised, for example, between 60° and 230° C. In this respect it is surprising to find that the products in accordance with the invention give rise, on paper and cardboard, to good performances even by simple drying at ambient temperature. Moreover, it was unexpected to find that the products in accordance with the invention are capable of conferring oleophobic and hydrophobic properties to paper and cardboard when they are applied in aqueous solution either superficially on the already finished materials or in mass, that is to say in the stuff or in the pulp, before or during the sizing operation, without having a detrimental effect on the rate of sizing or on the eventual printability.

To obtain a good fixing of the compositions containing products in accordance with the invention on the materials onto which they are applied and to impart to them moreover a special effect, it is sometimes advantageous to add to them certain additives, polymers, thermo-condensable products and catalysts capable of promoting cross-linkage with the support. Among these may be mentioned the condensates or precondensates of urea or of melamine formaldehyde, methylol dihydroxyethylene urea and its derivatives, urones, methylol-ethylene-ureas, methylol-propylene-ureas, methylol-triazone, the condensates of dicyanodiamide-formaldehyde, methylol-carbamates, methylol-acrylamides or methacrylamides, their polymers or copolymers, divinyl sulfone, polyamides, epoxy derivatives such as diglycidyl glycerol, the halides of epoxypropyl trialkyl (aryl) ammonium such as (2,3-epoxypropyl) trimethyl-ammonium chloride, N-methyl N-(2,3-epoxypropyl) morpholinium chloride, certain halogenated derivatives such as chloroepoxy-propane and dichloropropanol, or polar compounds such as the disodium salt of trisulfato-oxyethyl-sulfonium-betaine and the pyridinium salt of the chloromethyl ether of ethylene glycol.

If it is desired to increase the hydrophobic character of the materials treated with the products in accordance with the invention, it is possible to use jointly certain hydroproofing agents such as paraffin or natural or synthetic wax emulsions, compositions on the basis of alkylketenes, silicones, chlorohydrate of stearamido-methyl-pyridinium, the condensates of fatty-chain compounds with melamine or urea derivatives such as the product obtained on reacting stearic acid with hexa(methoxymethyl)-melamine, triethanolamine and acetic acid. It is also possible to use salts of inorganic or organic acids such as aluminum acetate, aluminum formate, aluminum stearate, zirconium acetate, zirconium carbonate, zirconium oxychloride or Werner complexes such as chromium stearatochloride.

Finally, in order to obtain certain effects, it is also possible to employ the fluorinated products in accordance with the invention in combination with other fluorinated products such as those described in French Pat. Nos. 2,175,332 and 2,155,133 and the French patent application Nos. 75 31794 and 75 23898 filed by the assignee of the applicants, or with polymers or auxiliary products such as vinylic or acrylic polymers or copolymers, possibly in the form of latex, polyalkylenes, polyglycols, emollients, colloids such as starch, dextrin, casein, sizing agents, fixing or retaining agents, buffering agents, fireproofing, antistatic, fungicidal agents, optical bleaching agents, sequestring agents, mineral salts and charges, surface-active agents and even swelling agents capable of promoting the penetration of fluorinated copolymers into the interior of the fibers, notably cellulose fibers, by using polyalkylene glycol or diethylene sulfone ethers.

Besides their applications in permitting the achievement of an oilproofing and waterproofing effect on paper and cardboard, as well as anti-adhesion properties, the products in accordance with the invention may also be used as a screen against solvents or certain aggressive chemical substances used in the coating of lacquers and varnishes. The resistance to toluene during coating operations on papers intended for photocopying illustrates this application. The same applies with regard to certain solvents which form part of printing inks. They may also be used for other applications such as "waterproofing", "stainresisting" or "soil release" finishes on textiles or leather. They may also be used for the treatment of textiles fibers and notably for carrying out the oiling or sizing of the same or for obtaining particular properties such as anti-static or antipilling effects. On materials such as wood, metals, plastics, concrete, plaster, interesting properties for mould-stripping, and in the fight against corrosion or fouling and the problems relating to adhesion resistance may be obtained.

In order to evaluate the performance of papers and cardboards treated with the products in accordance with the invention, the applicants have used a certain number of tests, the main ones of which are as follows:

Greaseproofness test or "Kit value"

This test, described in Tappi, Vol. 50, No. 10, pages 152A and 153A, standard RC 338 and UM511, permits measurement of the greaseproofness of materials towards mixtures of castor oil, toluene and heptane. These contain variable quantities by volume of these three products as set forth in the following Table 1.

TABLE I

| "Kit value" | Volume of castor oil | Volume of toluene | Volume of heptane |
|---|---|---|---|
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

The test consists of gently placing some drops of these mixtures onto the paper treated. The drops are allowed to stay on the paper for 15 seconds, after which time the appearance of the papers or cardboards is carefully inspected and the wetting or penetration evidenced by browning of the surface are noted. The value corresponding to the mixture containing the highest percentage of heptane failing to penetrate or to wet the paper is the "kit value" of the paper and is regarded as the measure of oleophobic property of the paper treated. The higher the "kit value", the better is the oleophobic property of the paper.

Turpentine oil test

This test is described in TAPPI, standard T 454, ts 66 (1966). 5 g of Fontainebleau sand, acid-washed, are placed onto the treated paper which in turn is placed on a white Bristol-board. 1.1 cc of anhydrous turpentine oil colored by 0.5 g per liter of Organol Red B S. is poured out. When the pouring is finished, a chronometer is released. The paper is shifted every 30 seconds on the Bristol-board and the time until the moment when the Bristol-board becomes stained is noted. Any value beyond 30 minutes may be regarded as no longer significant and the material tested as showing excellent performance.

The test is carried out on 7 samples of the same paper. The smallest and the largest values found are noted and the fourth value is regarded as the mean value.

Test measuring the hydrophobic property

This test allows determination of the resistance to water. It consists of gently placing a drop of water onto the paper treated. The drop is allowed to stay on the paper for 60 seconds after which time the appearance of the surface of the papers and cardboards is carefully inspected. Wetting and penetration of the water are made evident by a browning of the material.

Test measuring the resistance to aggressive products or solvents

This test allows an evaluation of the barrier effect of supports treated in respect of certain products such as water, a 10% soda solution, a 35.7% hydrochloric acid solution, heptane, white spirit, toluene, trichloroethylene, 1,1,1-trichloroethane, monochlorobenzene, methanol, cyclohexanone, dioxane, and ethylene glycol monoacetate.

The method consists of gently placing a drop of these products onto the paper treated. The drop is allowed to stay on the paper for 30 seconds, after which time the appearance of the surface of the papers and cardboards is carefully inspected. The failure of the test is made evident by a browning of the material induced by wetting or penetration of the liquid. It is also possible to use a mirror held a few centimeters below the paper to be tested.

Test for assessing the non-influence on sizing

The method consists in sizing and in treating the papers with the products in accordance with the invention in a simultaneous manner according to the method described in French Pat. No. 2,270,372 of the assignee of the applicants which corresponds to U.S. Pat. No. 4,070,319.

The degree of sizing obtained, the suitability for writing and the resistance to alkalis are then measured in accordance with the method described in that same patent.

Test of printing quality

The suitability for printing of the papers produced with the products in accordance with the invention is assessed with the help of the apparatus of the Dutch Institute IGT by depositing 0.6 g of a high-tack ink at a uniformly accelerated speed and at a pressure of 37.5 kg/cm. The test is carried out by using inks of different tack provided by Ets. Lorilleux LeFranc as described on page 12 of French Pat. No. 2,087,531 of the assignee of the applicants, corresponding to British Pat. No. 1,356,030.

For an assessment of the "stain-resisting", "hydrophobic" or "soil release" properties, which are obtained with the products of the invention on textiles, nonwoven fabrics, leather or other materials, the customary tests may be employed, such as those described in French Pat. No. 2,175,332 and in French Patent application No. 75 31794 by the assignee of the applicants. Mention may be made, for example, of the methods described in "AATCC Technical Manual-Test Method" No. 118-1972, No. 22-1971 or No. 130-1970.

The following examples wherein the percentages specified are by weight, illustrate the invention without limiting it.

EXAMPLE 1

Into a 1000 cc flask fitted with a stirrer, a reflux condenser and a thermometer are placed 500 g of toluene, 50.5 g (0.5 mole) of triethylamine and 68 g (0.5 mole) of ethylene glycol monomethacrylate. The mass is cooled to −10° C. and with the help of a dropping funnel 76.5 g (0.5 mole) of phosphorus oxychloride are added, controlling the flow so that the temperature of the mass is maintained between −10° and +10° C. After having stirred the reaction mixture at ambient temperature for 72 hours, the triethylamine chlorohydrate is separated by filtration. In this manner 483 g of a 25% solution of dichlorophosphato ethyl methacrylate in toluene is obtained.

Into a 500 cc flask fitted with a stirrer, a reflux condenser, a thermometer and a heating device are placed 30 g of toluene and 12 g (0.13 mole) of thioglycollic acid. The mixture is heated to 100° C. and by means of a dropping funnel a solution consisting of 160 g of toluene, 12 g of the toluene solution prepared previously (containing 3 g of monomer or 0.01 mole), 2 g of 4,4'-azo-bis-(4-cyano pentanoic) and 54 g (0.10 mole) of a polyfluorinated monomer of the formula:

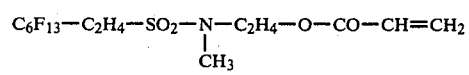

is added over a period of approximately 2 hours. The reaction mass is maintained for 5 hours at 100° C., then the toluene is distilled off. After cooling down to 60° C., the cotelomer so obtained is diluted and neutralized by the addition of 100 g of acetone, 100 g of water and 16 g of diethylamino ethanol. After cooling to ambient temperature, 275 g of a solution S1 of the cotelomer according to the invention are obtained. This solution is miscible with cold water in all proportions giving a homogeneous solution with a proportion of dry substances of 26% and a proportion of fluorine of 9.0%. The cotelomer obtained is not consistent, it appears in the form of a paste with a point of liquefaction of approximately 82° C.

This product is applied onto an unsized paper of the following characteristics:
Fibrous composition:
 60% of bleached hardwood Kraft pulp
 40% of bleached softwood Kraft pulp
Refining on the OO Hydrafiner up to 35° S R
Additives introduced:
 Talc 15%
 Retention agent (RETAMINOL E of BAYER) 3%
Weight per m² of paper: 70 to 71 g/m²
Humidity of paper: 4 to 5%

For this purpose a bath for Size-press at 0.6 g of fluorine per liter is prepared having the composition (in g/liter) as shown in Table 2.

TABLE 2

| Size-press bath at 0.6 g of fluorine per liter (A) | Grams |
|---|---|
| Solution S 1 at 26% of dry substances and 9.0% of fluorine | 6.6 |
| Water | 993.4 |
| | 1000.0 |

Five sheets of unsized paper are surface-treated on a Size-press with the help of the bath at a discharge rate of 90%. These five sheets are dried at 130° C., 110° C., 80° C., 60° C., and 25° C., respectively. Whatever the temperature of drying, a paper of a grease-resistant character is obtained. The characteristics are listed in the following Table 3 compared to those of an identical, untreated paper.

TABLE 3

| Conditions of application | Characteristics | |
|---|---|---|
| | Oleophobic property (Kit value) | Turpentine oil Test |
| Papers treated with bath (A) for Size-press and dried 2 minutes at 130° C. | 7 | more than 30 minutes |
| Paper treated with the same bath and dried 2 minutes at 110° C. | 7 | more than 30 minutes |
| Paper treated with the same bath and dried 2 minutes at 80° C. | 7 | more than 30 minutes |
| Paper treated with the same bath and dried 4 minutes at 60° C. | 7 | more than 30 minutes |
| Paper treated with the same bath and dried 16 hours at 25° C. | 7 | more than 30 minutes |
| Untreated paper (reference) | 0 | less than 30 seconds |

A perusal of the results of Table 3 indicates that the paper treated with the product in accordance with the invention possesses a remarkable grease-resisting character and this is true even when the temperature of the heat treatment to which it is subjected varies within wide limits. It is interesting to note, moreover, that after a simple drying at ambient temperature, the paper obtained possesses this character.

EXAMPLE 2

Into a 500 cc reactor fitted with a stirrer, a reflux condenser, a thermometer and a heating device, 30 g of toluene are introduced. The contents of the flask are heated to 100° C. and by means of a droping funnel a solution consisting of 170 g of toluene, 14 g (0.15 mole) of thioglycollic acid, 2 g of 2,2′-azo-bis-isobutyronitrile and 60 g (0.11 mole) of polyfluorinated monomer of the formula:

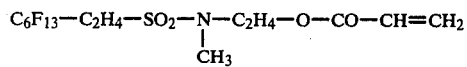

is added over a period of approximately 2 hours.

The reaction mass is maintained for 6 hours at 100° C., then the toluene is distilled off. After cooling to 60° C., the telomer so obtained is diluted and neutralized through the addition of 150 g of isopropanol, 50 g of methyl ethyl ketone and 20 g of diethylamino ethanol. After cooling to ambient temperature, 290 g of a solution S 2 of telomer according to the invention are obtained. This solution, miscible with cold water in all proportions giving a homogeneous solution has a proportion of dry substances of 32% and a proportion of fluorine of 9.5%. The telomer obtained is not consistent, it appears in the form of a paste, the point of liquefaction of which is approximately 85° C.

This product is tested at an equal proportion of fluorine by comparison with:

(a) A perfluorinated alcohol phosphate of formula (I):

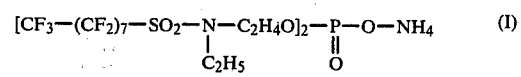

described in Example 4 of French Pat. No. 2,093,525;

(b) another perfluorinated phosphate of formula (II):

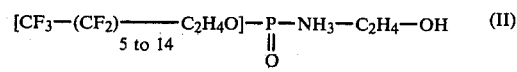

described in Example 3 of French Pat. No. 2,093,525; and (c) a telomer of formula (III):

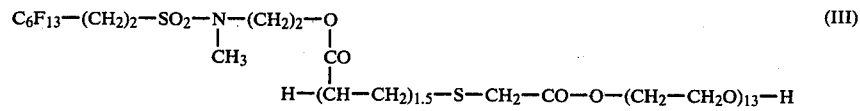

described in Example 1 of French Patent application No. 75 31794 and corresponding U.S. Application Ser. No. 727,497 filed Sept. 28, 1976.

A. These products are applied to unsized paper, the characteristics of which are given in Example 1.

1. For this purpose 4 baths at 0.6 g of fluorine per liter for Size-press are prepared having the composition (in g/liter) shown in the following Table 4.

TABLE 4

| Size-press baths at 0.6 g of fluorine per liter | Baths | | | |
|---|---|---|---|---|
| | No. 1 | No. 2 | No. 3 | No. 4 |
| | g | g | g | g |
| Solution S 2 at 32% of dry substances and 9.5% of fluorine | 6.4 | | | |
| Solution of compound (I) at 35.7% of dry substances and at 18.8% of fluorine | | 3.2 | | |
| Solution of compound (II) at 31% of dry substances and 16.7% of fluorine | | | 3.6 | |
| Solution of compound (III) at 28% of dry substances and at 7% of fluorine, self-emulsifiable in water | | | | 8.6 |
| Water | 993.6 | 996.8 | 996.4 | 991.4 |
| Total | 1000 | 1000 | 1000 | 1000 |

Four sheets of unsized paper are treated on Size-press in these 4 baths respectively with a rate of discharge of 90%. After 2 minutes drying at 130° C., papers presenting a more or less grease-resistant character are obtained. The characteristics are listed in the following Table 5 compared to those of an untreated paper.

TABLE 5

| Characteristics | Paper treated with baths | | | | Untreated Paper |
|---|---|---|---|---|---|
| | No. 1 | No. 2 | No. 3 | No. 4 | |
| Oleophobic property (Kit value) | 8 | 8 | 8 | 8 | 0 |
| Turpentine oil test (in minutes | more than | 2 min. | 1 min. | 1 min. | less than 30 seconds |

TABLE 5-continued

| Characteristics | Paper treated with baths | | | | Untreated Paper |
|---|---|---|---|---|---|
| | No. 1 | No. 2 | No. 3 | No. 4 | |
| or seconds) | 30 min. | | | | |

The paper treated with bath No. 1 according to the invention presents superior characteristics to those of the other papers.

2. Four other baths at 3 g of fluorine per liter for Size-press are prepared having the composition (in g/liters) shown in Table 6.

TABLE 6

| Size-press baths at 3 g of fluorine/liter | Baths | | | |
|---|---|---|---|---|
| | No. 5 | No. 6 | No. 7 | No. 8 |
| | g | g | g | g |
| Solution S 2 | 31.5 | | | |
| Solution of compound (I) | | 16.0 | | |
| Solution of compound (II) | | | 18.0 | |
| Solution of compound (III) | | | | 42.8 |
| Water | 968.5 | 984 | 982 | 957.2 |
| Total | 1000 | 1000 | 1000 | 1000 |

Four sheets of unsized paper are treated on Size-press in these 4 baths respectively with a rate of discharge of 90%. After drying for 2 minutes at 130° C., papers presenting a more or less pronounced hydrophobic character are obtained. Moreover, they possess variable degrees of resistance towards aggressive products and solvents. The characteristics are listed in the following Table 7 compared to those of an untreated paper.

TABLE 7

| Characteristics | Papers treated with baths: | | | | Untreated paper |
|---|---|---|---|---|---|
| | No. 5 | No. 6 | No. 7 | No. 8 | |
| Hydrophobic property | | | | | |
| (drop of water - 60 seconds) | G | B | G | G | B |
| Resistance to aggressive products and to solvents (1 drop - 30 seconds) | | | | | |
| 10% aqueous solution of NaOH | G | B | G | G | B |
| 35.7% aqueous solution of HCl | G | B | B | B | B |
| Heptane | G | B | G | B | B |
| White Spirit (Bp145 to 200° C.) | G | G | G | B | B |
| Toluene | G | G | G | B | B |
| Trichloroethylene | G | G | G | B | B |
| 1,1,1-Trichloroethane | G | G | G | B | B |
| Monochlorobenzene | G | G | G | B | B |
| Methanol | G | B | B | B | B |
| Cyclohexanone | G | G | G | B | B |
| Dioxane | G | G | G | B | B |
| Ethyleneglycol monoacetate | G | G | B | B | B |

G = Good
B = Bad

The perusal of the results of Table 7 indicates that the paper treated with the product according to the present invention possesses a hydrophobic character and is endowed with a good resistance towards acids, bases and numerous solvents.

B. Four paper sheets are prepared by means of the compositions in the following Table 8 containing 0.02 g of fluorine per 160 g of aqueous pulp:

TABLE 8

| Compositions | No. 9 | No. 10 | No. 11 | No. 12 |
|---|---|---|---|---|
| Dry "bleached bisulfite" pulp | 4 g | 4 g | 4 g | 4 g |
| Water | 156 | 156 | 156 | 156 |
| Solution S 32 at 32% of dry substances and 9.5% of fluorine | 0.21 | | | |
| Solution of compound (I) at 35.7% of dry substances and at 18.8% of fluorine | | 0.11 | | |
| Solution of compound (II) at 31% of dry substances and at 16.7% of fluorine | | | 0.12 | |
| Solution of compound (III) at 28% of dry substances and at 7% of fluorine self-emulsifiable in water | | | | 0.29 |

Each pulp so prepared as diluted in the bowl of a "Rapid-Kotten" machine with 4 liters of water. The mixture is stirred for 30 seconds and then filtered by suction. The paper sheets so obtained are dried under vacuum for 10 minutes at 90° C., on the plates of the "Rapid-Kotten" machine.

In this manner four sheets of paper, treated in the mass, are obtained, the characteristics of which are listed in the following Table 9 compared to an untreated blank sheet.

TABLE 9

| | Characteristics | |
|---|---|---|
| | Oleophobic property (Kit value) | Turpentine oil test |
| Sheet prepared with composition 9 | 7 | more than 30 minutes |
| Sheet prepared with composition 10 | 7 | 1 minute |
| Sheet prepared with composition 11 | 7 | 1 minute |
| Sheet prepared with composition 12 | 7 | 1 minute |
| Reference sheet | 0 | less than 30 seconds |

EXAMPLE 3

Into a 500 cc reactor, fitted with a stirrer, a reflux condenser, a thermometer and a heating device, are placed 30 g of toluene and 5 g (0.05 mole) of thioglycollic acid. The mixture is heated to 100° C. and a solution consisting of 170 g of toluene, 2 g of 2,2'-azo-bis-isobutyronitrile, 6 g (0.06 mole) of maleic anhydride and 54 g (0.10 mole) of the polyfluorinated monomer of the formula:

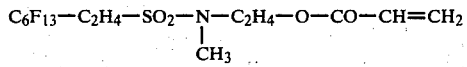

is added by means of a dropping funnel over a period of approximately 2 hours.

The reaction mass is maintained for 5 hours at 100° C., then the toluene is distilled off. After cooling to 60° C. the cotelomer so obtained is diluted and neutralized by the addition of 100 g of acetone, 100 g of water and 13 g of diethylamino ethanol. After cooling to ambient temperature, 268 g of a solution S 3 of cotelomer according to the invention are obtained. This solution is miscible with cold water in all proportions, giving a homogeneous solution with a proportion of dry substances of 27.2% and a proportion of fluorine of 9.2%. This cotelomer is not consistent, it appears in the form of a paste, the point of liquefaction of which is approximately 80° C.

This product is applied to fabrics made of acrylic fibers (DRALON), polyester fibers (TERGAL) and wool. To this end a padding bath is prepared of the composition of Table 10.

TABLE 10

| Padding bath | g/l |
| --- | --- |
| Solution S 3 of the cotelomer with 27.2% of dry substances and 9.2% of fluorine | 20 |
| 65% aqueous solution of a precondensate of hexamethylolmelamine trimethyl ether | 20 |
| Ammonium chloride | 5 |

The 3 aforementioned fabrics are padded at a mangle expression of approximately 103%, 79%, and 85% respectively. The fabrics are then treated for 3 minutes at 165° C. for the first two and 3 minutes at 110° C. for wool, in a Benz thermocondenser.

The characteristics of the fabrics so treated (T) are indicated in the following Table 11 compared to those of untreated black fabrics (NT).

TABLE 11

| Characteristics | DRALON fabric T | DRALON fabric NT | TERGAL fabric T | TERGAL fabric NT | WOOL fabric T | WOOL fabric NT |
| --- | --- | --- | --- | --- | --- | --- |
| Hydrophobic property (spray test) standard AATCC - 22 - 1971 | 100 | 0 | 80 | 50 | 100 | 80 |
| Oleophobic property standard AATCC - 118 - 1972 | 4 | 0 | 5 | 0 | 6 | 0 |

A perusal of the results of Table 11 shows that the fabrics finished with the product in accordance with the invention possess stain-resisting character, that is to say they are capable of withstanding lean and fat stains.

EXAMPLE 4

Into a 500 cc flask, fitted with a stirrer, a reflux condenser, a thermometer and a heating device, are placed 15 g of tetrahydrofurane, the flask is heated to 65° C. and a solution consisting of 100 g of tetrahydrofurane, 1 g of 2,2'-azo-bisisobutyronitrile, 1 g of tert.butyl perpivalate, 7.5 g (0.08 mole) of thioglycollic acid and 30 g (0.05 mole) of the polyfluorinated monomer of the formula:

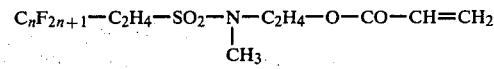

is added by means of a dropping funnel over a period of approximately 2 hours. In the above formula, $C_nF_{2n+1}$ represents a static mixture of:

59% of $C_6F_{13}$
25% of $C_8F_{17}$
8% of $C_{10}F_{21}$
3% of $C_{12}F_{25}$

The reaction mass is maintained for 5 hours at 65° C. After cooling to 50° C., the cotelomer so obtained is diluted and neutralized by the addition of 100 g of acetone and 10 g of diethylamino ethanol. After cooling to ambient temperature, 244 g of a solution S 4 of cotelomer according to the invention are obtained. This solution is miscible with cold water in all proportions giving a homogeneous solution with a proportion of dry substances of 19.4% and a proportion of fluorine of 5.9%. This cotelomer is not consistent, it appears in the form of a paste, the point of liquefaction of which is approximately 92° C.

This product is applied onto unsized paper, the characteristics of which are given in Example 1.

To this end a bath at 0.7 g of fluorine per liter for Size-press is prepared having the composition (in g/liter) shown in the following Table 12.

TABLE 12

| Size-press bath at 0.7 g of fluorine per liter | |
| --- | --- |
| Solution S 4 with 19.4% of dry substances and 5.9% of fluorine | 12 g |
| Water | 988 g |
| | 1000 g |

A sheet of unsized paper is treated on the Size-press by means of a bath with a rate of discharge of 90%. After 2 minutes drying at 130° C. a paper presenting grease-resistant character is obtained. Its characteristics are listed in the following Table 13 compared to those of an untreated blank paper:

TABLE 13

| Characteristics | Paper treated with the bath of Table 12 | Untreated paper |
| --- | --- | --- |
| Oleophobic property (Kit value) | 8 | 0 |
| turpentine oil test | more than 30 minutes | less than 30 seconds |

EXAMPLE 5

Into a 500 cc flask, fitted with a stirrer, a reflux condenser, a thermometer and a heating device, are placed 30 g of toluene, 11 g (0.12 mole) of thioglycollic acid, the mixture is heated to 100° C. and a solution consisting of 100 g of toluene, 2 g of 2,2'-azo-bis-isobutyronitrile and 60 g (0.11 mole) of the polyfluorinated monomer of the formula:

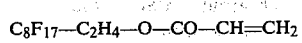

is added by means of a dropping funnel over a period of approximately 2 hours.

The reaction mass is maintained at 100° C. for 5 hours, then the toluene is distilled off. After cooling to 60° C., the telomer so obtained is diluted and neutralized through the addition of 100 g of acetone, 100 g of water and 15 g of diethylamino ethanol. After cooling to ambient temperature, 283 g of a solution S 5 of telomer according to the invention are obtained. This solution is miscible with cold water in all proportions giving a homogeneous solution with a proportion of dry substances of 30.3% and a proportion of fluorine of 13.1%. This telomer is not consistent, it appears in the form of a paste, the point of liquefaction of which is approximately 90° C.

This product is applied onto unsized paper, the characteristics of which are given in Example 1.

To this end a bath containing 0.7 g of fluorine per liter for Size-press is prepared having the composition (in g/liter) as shown in the following Table 14.

TABLE 14

| Size-press at 0.7 g of fluorine per liter | Grams |
|---|---|
| Solution S 5 with 30.3% of dry substance and 13.1% of fluorine | 5.4 |
| Water | 994.6 |
| | 1000 |

A sheet of unsized paper is treated on the Size-press by means of this bath with a rate of discharge of 90%. After 2 minutes drying at 110° C., a paper presenting a grease-resistant character is obtained. Its characteristics are listed in the following Table 15 compared to those of an untreated blank paper:

TABLE 15

| Characteristics | Paper treated with the bath of Table 14 | Untreated paper |
|---|---|---|
| Oleophobic property (Kit value) | 8 | 0 |
| Turpentine oil test | more than 30 minutes | less than 30 seconds |

EXAMPLE 6

Into a 500 cc flask fitted with a stirrer, a reflux condenser, a thermometer and a heating device, are placed 100 g of dioxane, 16.5 g (0.11 mole) of thiomalic acid, the mixture is heated to 95° C. and a solution consisting of 100 g of dioxane, 2 g of 2,2'-azo-bis-isobutyronitrile and 60 g (0.11 mole) of the polyfluorinated monomer of the formula:

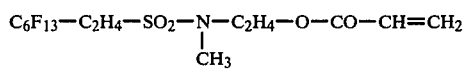

is addded by means of a dropping funnel over a period of approximately 2 hours.

The reaction mass is maintained at 95° C. for 5 hours. After cooling to 60° C., the telomer thus obtained is neutralized by the addition of 20 g of 2-amino 2-methyl 1-propanol. After cooling to ambient temperature, 296 g of a solution of S 6 of telomer in accordance with the invention are obtained. This solution is miscible with cold water in all proportions giving a homogeneous solution with a proportion of dry substances of 32.6% and a proportion of fluorine of 9.3%. This telomer is not consistent, it appears in the form of a paste, the point of liquefaction of which is approximately 103° C.

This product is applied onto an unsized AFNOR VII paper weighing 77 g/m². For this purpose a bath containing 5 g of fluorine/liter for Size-press is prepared having the composition (in grams per liter) as shown in the following Table 16.

TABLE 16

| Size-press bath at 5 g of fluorine per liter | Grams |
|---|---|
| Anionic latex with 20% of dry substances, obtained by copolymerization in emulsion of a mixture of monomers having the following composition: 64.3 parts of butyl acrylate 14.3 parts of vinyl acetate 20.0 parts of methacrylic acid 1.4 parts of N-methylol acrylamide (Cited in Example 3 of French Patent No. 2,270,372) | 15 |
| Solution S 6 with 32.6% of dry substances and 9.3% of fluorine | 53.7 |
| Sodium acetate | 1 |
| Ammonia at 30% by weight of NH₃ (d = 0.892) | 2.5 |
| Water | 927.8 |
| | 1000 |

A sheet of unsized paper is treated on the Size-press by means of this bath at a rate of dischage of 97%. After 2 minutes drying at 130° C. a sized paper, perfectly suitable for writing and presenting a remarkable grease-resistant character is obtained. Its characteristics are listed in the following Table 17 compared to those of an identical untreated paper:

TABLE 17

| Characteristics | | Paper treated with the bath of Table 16 | Untreated paper |
|---|---|---|---|
| Oleophobic property (Kit value) | | 9 | 0 |
| Turpentine oil test | | more than 30 minutes | less than 30 seconds |
| COBB test (water absorbed in g/m² in one minute) | | 30 | 160 |
| Suitability for writing | Hairline | 5 | 0 |
| | Strike-through | 5 | 0 |

In this example the degree of sizing, measured by the absorbent capacity of the paper towards water, is evaluated by the Cobb and Lowe method (TAPPI Standard T441), codified by the Comite de Essais du Laboratoire Central de l'Industrie Papetiere Suedoise (Project P.C.A. 13-59), the method consisting in measuring the weight of water absorbed during one minute by one square meter of paper supporting a height of water of one centimeter; the suitability of the paper for writing and printing is assessed by the test described in the ATIP Bulletin No. 2, 1960, pages 84 to 91 (P. Philbee) which consists in performing on the paper strokes without hairline or strike-through with standardized inks, numbered 1 to 5 in ascending order of aggressiveness.

EXAMPLE 7

Into a 500 cc flask, fitted with a stirrer, a reflux condenser, a thermometer and a heating device, are placed 30 g of toluene. The flask is heated to 100° C. and a solution consisting of 170 g of toluene, 2 g of 2,2'-azo-bis-isobutyronitrile, 16 g (0.17 mole) of tyioglycollic acid and 60 g (0.11 mole) of the polyfluorinated monomer of the formula:

$$C_6F_{13}-C_2H_4-SO_2-\underset{\underset{CH_3}{|}}{N}-C_2H_4-O-CO-CH=CH_2$$

is added by means of a dropping funnel over a period of approximately 2 hours.

The reaction mass is maintained at 100° C. for 5 hours, then the toluene is distilled off. After cooling to 60° C., the telomer so obtained is diluted and neutralized by the addition of 100 g of acetone, 80 g of water and 20 g of ammonia with 30% by weight of $NH_3$. After cooling to ambient temperature, 271 g of a solution S 7 of telomer in accordance with the present invention are obtained. This solution is miscible with cold water in all proportions giving a homogeneous solution with a proportion of dry substances of 30.5% and a proportion of fluorine of 10.1%. This telomer is not consistent, it appears in the form of a paste, the point of liquefaction of which is approximately 86° C.

A sample of aluminum is dip-coated with this solution S 7. It is allowed to dry for 8 hours at ambient temperature, then a few drops of a 0.25N aqueous soda solution are placed onto the sample so treated and onto an untreated reference sample and allowed to remain in contact for 24 hours. After this time the tested surface of the samples is wiped with a moist cloth. It is found then that the untreated reference sample has been attacked by the soda, this attack being characterized by the formation of a greyish stain and a depolished surface. At the same time it is found that there has been no attack whatever on the sample treated with the product in accordance with the present invention.

EXAMPLE 8

Into a 500 cc flask, fitted with a stirrer, a reflux condenser, a thermometer and a heating device, are placed 30 g of isopropanol and 10 g (0.10 mole) of thioglycollic acid. The flask is heated to 80° C. and a solution consistng of 170 g of isopropanol, 2 g of 2,2'-azo-bis-isobutyronitrile, 12 g (0.16 mole) of acrylic acid and 48 g (0.08 mole) of the polyfluorinated monomer of the formula:

$$C_6F_{13}-C_2H_4-SO_2-\underset{\underset{CH_3}{|}}{N}-C_2H_4-O-CO-CH=CH_2$$

is added by means of a dropping funnel over a period of approximately 2 hours.

The reaction mass is maintained at 80° C. for 5 hours, 33 g of diethylaminoethanol are added to the cotelomer so obtained and the mixture is cooled to ambient temperature. After filtration, 286 g of a solution S 8 of cotelomer in accordance with the present invention are obtained. This solution is miscible with cold water in all proportions giving a homogeneous solution with a proportion of dry substances of 36.0% and a proportion of fluorine of 7.7%. This cotelomer is not consistent, it appears in the form of a paste, the point of liquefaction of which is approximately 78° C.

This product is applied onto unsized paper, the characteristics of which are given in Example 1.

To this end a bath at 0.8 g of fluorine per liter for the Size-press is prepared with the composition (in g/liter) in the following Table 18:

TABLE 18

| Size-press bath at 0.8 g of fluorine per liter | Grams |
|---|---|
| Solution S 8 at 36% of dry substances and 7.7% of fluorine | 10.4 |
| Water | 989.6 |
| | 1000 |

A sheet of unsized paper is treated on the Size-press by means of the bath with a rate of discharge of 90%. After 3 minutes drying at 110° C., a paper presenting a grease-resistant character is obtained. Its characteristics are listed in the following Table 19 compared to those of an untreated reference paper:

TABLE 19

| Characteristics | Paper treated with the bath of Table 18 | Untreated paper |
|---|---|---|
| Oleophobic property (Kit value) | 9 | 0 |
| Turpentine oil test | more than 30 minutes | less than 30 seconds |

EXAMPLE 9

Into a 500 cc flask fitted with a stirrer, a reflux condenser, a thermometer and a heating device, are placed 30 g of toluene and 10 g (0.10 mole) of thioglycollic acid. The flask is heated to 100° C. and a solution consisting of 170 g of toluene, 2 g of triethylamine, 60 g (0.11 mole) of the polyfluorinated monomer of the formula:

$$C_6F_{13}-C_2H_4-SO_2-\underset{\underset{CH_3}{|}}{N}-C_2H_4-O-CO-CH=CH_2$$

is added by means of a dropping funnel over a period of approximately 2 hours.

The reaction mass is maintained at 100° C. for 5 hours, then the toluene is distilled off. After cooling to 60° C., the condensate so obtained is diluted and neutralized by the addition of 100 g of water, 100 g of acetone and 13 g of diethylaminoethanol. After cooling to ambient temperature, 274 g of a solution S 9 of a condensate according to the present invention are obtained. This solution is miscible with cold water in all proportions giving a homogeneous solution with a proportion of dry substances of 30.2% and a proportion of fluorine of 10.0%. This condensate is not consistent, it appears in the form of a paste, the point of liquefaction of which is approximately 72° C.

This product is applied by brush to three different leathers and allowed to dry for 16 hours at ambient temperature. Leathers presenting remarkable grease-resistant and complete hydrophobic properties are obtained. The characteristics of the leathers so treated (T) have been listed in the following Table 20 compared to those of untreated leathers (NT).

TABLE 20

| | Calfskin hairside chrometanned | | Goatskin chrometanned | | Barane (sheep) | |
|---|---|---|---|---|---|---|
| Characteristics | T | NT | T | NT | T | NT |
| Hydrophobic | | | | | | |

TABLE 20-continued

| Characteristics | Calfskin hairside chrometanned T | Calfskin hairside chrometanned NT | Goatskin chrometanned T | Goatskin chrometanned NT | Barane (sheep) T | Barane (sheep) NT |
| --- | --- | --- | --- | --- | --- | --- |
| property (spray test) standard AATCC - 22 - 1971 | 100 | 0 | 100 | 0 | 100 | 0 |
| Oleophobic property standard AATCC - 118 - 1972 | 8 | 0 | 8 | 0 | 8 | 0 |

The product obtained in Example 9 is further tested at an equal proportion of fluorine by comparison with a telomer of formula (I):

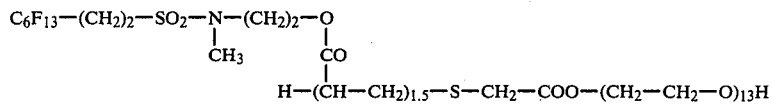

described in Example 1 of French application No. 75 31794 and corresponding U.S. Application Ser. No. 727,497 filed Sept. 28, 1976. For this purpose, 2 baths at 7% of fluorine are prepared. These products are applied by brush to three different leathers [calfskin hairside chrometanned, goatskin chrometanned and barane (sheep),] and allowed to dry for 16 hours at ambient temperature. A few drops of turpentine oil colored by 0.5 g/l of Organol Red BS are placed onto leathers treated with solution S 9, leathers treated with telomer of formula (I) and untreated leathers. After two hours the drops deposited are absorbed with the help of a piece of blotting paper. It is found that an indelible red stain remains on the untreated leathers and leathers treated with telomer of formula (I), whereas there is no stain whatever on the leathers treated with the product of the present invention.

EXAMPLE 10

Into a 500 cc flask fitted with a stirrer, a reflux condenser, a thermometer and a heating device, are placed 100 g of dioxane and 17 g (0.11 mole) of thiosalicylic acid. The flask is heated to 100° C. and a solution consisting of 100 g of dioxane, 2 g of 2,2'-azo-bis-isobutyronitrile and 60 g (0.11 mole) of the polyfluorinated monomer of the formula:

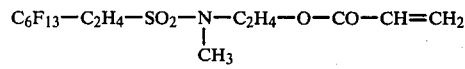

is added by means of a dropping funnel over a period of approximately 2 hours.

The reaction mass is maintained at 100° C. for 5 hours and then the dioxane is distilled off. After cooling to 60° C., the telomer so obtained is diluted and neutralized by the addition of 100 g of acetone, 100 g of water and 10 g of 2-amino 2-methyl 1-propanol. After cooling to ambient temperature 275 g of a solution S 10 of telomer in accordance with the invention are obtained. This solution is miscible with cold water in all proportions giving a homogeneous solution with a proportion of 31.6% of dry substances and a proportion of fluorine of 10.0%. This telomer is not consistent, it appears in the form of a paste, the point of liquefaction of which is approximately 85° C.

This product is applied onto the unsized paper, the characteristics of which are given in Example 1. To this end a bath at 2 g of fluorine per liter for Size-press is prepared having the composition (in g/liter) shown in the following Table 21.

TABLE 21

| Size-press bath at 2 g of fluorine per liter | Grams |
| --- | --- |
| Solution S 10 with 31.6% of dry substances and 10% of fluorine | 20 |
| Water | 980 |
| | 1000 |

A sheet of unsized paper is treated on the Size-press by means of this bath at a rate of discharge of 90%. After drying at 130° C. for 2 minutes a paper presenting a grease-resistant character is obtained. The characteristics are listed in the following Table 22 compared to those of an untreated reference paper:

TABLE 22

| Characteristics | Paper treated with the bath of Table 21 | Untreated paper |
| --- | --- | --- |
| Oleophobic property (Kit value) | 12 | 0 |
| Turpentine oil test | more than 30 minutes | less than 30 seconds |

EXAMPLE 11

Into a 500 cc flask fitted with a stirrer, a reflux condenser, a thermometer and a heating device, are placed 30 g of toluene and 14 g (0.15 mole) of thioglycollic acid. The flask is heated to 100° C. and a solution consisting of 170 g of toluene, 2 g of 2,2'-azo-bis-isobutyronitrile, 6 g (0.05 mole) of 2-chloro ethyl vinyl ether and 54 g (0.10 mole) of the polyfluorinated monomer of the formula:

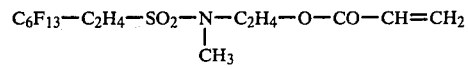

is added by means of a dropping funnel over a period of approximately 2 hours.

The reaction mass is maintained at 100° C. for 5 hours, then the toluene is distilled off. After cooling to 60° C., the cotelomer so obtained is diluted and neutralized by the addition of 100 g of water, 100 g of acetone and 18 g of diethylaminoethanol. After cooling to ambient temperature, 283 g of a solution S 11 of the cotelomer according to the present invention are obtained. This solution is miscible with cold water in all proportions giving a homogeneous solution with a proportion of dry substances of 32.5% and a proportion of fluorine of 8.8%. This cotelomer is not consistent, it appears in the form of a paste, the point of liquefaction of which is approximately 64° C.

This product is applied to unsized paper, the characteristics of which are given in Example 1.

To this end a bath at 0.6 g of fluorine per liter for Size-press is prepared having the composition (in g/liter) as shown in the following Table 23.

TABLE 23

| Size-press bath at 0.6 g of fluorine per liter | Grams |
|---|---|
| Solution S 11 with 32.5% of dry substances and 8.8% of fluorine | 6.8 |
| Water | 993.2 |
| | 1000 |

A sheet of unsized paper is treated on the Size-press by means of this bath at a rate of discharge of 90%. After drying at 100° C. for 2 minutes, a paper presenting a grease-resistant character is obtained. Its characteristics are listed in the following Table 24 compared to those of an untreated reference paper:

TABLE 24

| Characteristics | Paper treated with the bath of Table 23 | Untreated paper |
|---|---|---|
| Oleophobic property (Kit value) | 8 | 0 |
| Turpentine oil test | more than 30 minutes | less than 30 seconds |

EXAMPLE 12

Into a 500 cc flask fitted with a stirrer, a reflux condenser, a thermometer and a heating device, are placed 140 g of methyl ethyl ketone, 10 g (0.10 mole) of thioglycollic acid, 0.2 g of benzoyl peroxide, 54 g (0.10 mole) of the polyfluorinated monomer of the formula:

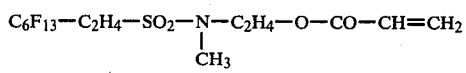

The mixture is heated to 80° C. and this temperature is maintained for 5 hours. After this, the telomer so obtained is diluted and neutralized by the addition of 140 g of isopropanol and 30 g of a condensation product of 3 molecules of ethylene oxide with 1 mole of triethanolamine. After cooling to ambient temperature, 358 g of a solution S 12 of telomer according to the present invention are obtained. This solution is miscible with cold water in all proportions giving homogeneous solutions with a proportion of dry substances of 26.2% and a proportion of fluorine of 6.9%. This telomer is not consistent, it appears in the form of a paste, the softening point of which is approximately 58° C.

This product is applied onto fabrics of polyester (TERGAL) and of polyamide (NYLON). To this end the padding bath in the following Table 25 is prepared:

TABLE 25

| Padding path | g/l |
|---|---|
| Solution S 12 of the cotelomer with 26.2% of dry substances and 6.9% of fluorine | 60 |
| 65% aqueous solution of a precondensate of hexamethylolmelamine trimethyl ether | 40 |
| Isopropanol | 20 |
| Ammonium chloride | 10 |

The two abovementioned fabrics are padded at a mangle expression of 84% (Tergal) and 108% (Nylon) respectively.

The fabrics are then treated at 160° C. for 2 minutes in a Benz thermocondenser. The resistance under 500 Volt (d.c.) is measured on a strip of the fabric so treated (T) of 10 cm length and 5 cm width, at 65° hygrometric and at 20° C. in comparison to that of an untreated fabric (NT). On the treated fabric a diminution of resistance is found which represents proof of the good discharge of static electricity. Moreover, the fabrics treated with the product in accordance with the present invention present hydrophobic and oleophobic properties as indicated by the performances recorded in Table 26 below.

TABLE 26

| Characteristics | Polyester | | Nylon | |
|---|---|---|---|---|
| | T | NT | T | NT |
| Resistivity in Ohm | $1.2\ 10^{11}$ | $2.5\ 10^{13}$ | $5.7\ 10^{11}$ | $8.0\ 10^{13}$ |
| Oleophobic property standard AATCC 118 - 1972 | 6 | 0 | 6 | 0 |
| Hycrophobic property standard AATCC .22 - 1971 (Spray-test) | 70 | 50 | 80 | 0 |

EXAMPLE 13

Into a 500 cc reactor fitted with a stirrer, a reflux condenser, a thermometer and heating device, are placed 30 g of toluene. The flask is heated to 100° C. and a solution consisting of 170 g of toluene, 14 g (0.15 mole) of thioglycollic acid, 2 g of 2,2'-azo-bis-isobutyronitrile and 60 g (0.11 mole) of the polyfluorinated monomer of the formula:

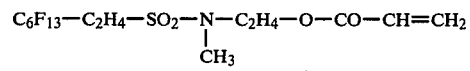

is added by means of a dropping funnel over a period of approximately two hours.

The reaction mixture is maintained at 100° C. for 6 hours and then the toluene is distilled off. After cooling to 60° C., the telomer thus obtained is diluted by the addition of 190 g of isopropanol. After cooling to ambient temperature 256 g of a solution S 13 of telomer according to the present invention are obtained having a proportion of dry substances of 28.9% and a proportion of fluorine of 10.7%. The telomer obtained is not consistent, it appears in the form of a paste, the point of liquefaction of which is approximately 84° C.

This product is tested at an equal proportion of fluorine by comparison with a telomer of formula (I):

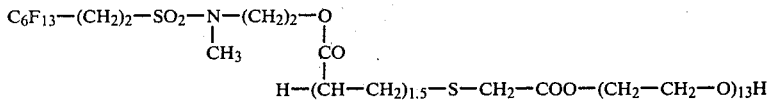

described in Example 1 of French application No. 75 31794 and corresponding U.S. Application Ser. No. 727,497 filed Sept. 28, 1976. For this purpose, 2 baths at 7% of fluorine are prepared. These solutions are applied by means of a brush onto a board of oakwood and it is allowed to dry for 8 hours at ambient temperature. A few drops of water are deposited on boards and it is found that they evaporate without leaving a trace on wood treated with solution S13, they evaporate forming a stain on wood treated with the solution of telomer of formula (I), whereas under the same conditions, on untreated wood, the water penetrates instantly forming a stain.

Furthermore, a few drops of turpentine oil colored by 0.5 g/l of Organol Red BS are placed onto another board of oakwood coated with solution S 13. The same procedure is followed with a board of oakwood treated with the solution of the telomer of formula (I) and an untreated board of oakwood. After two hours the drops deposited are absorbed with the help of a piece of blotting paper. It is found that an indelible red stain remains on the untreated wood and the wood treated with the solution of the telomer of formula (I) whereas there is no stain whatever on the wood treated with the product of the present invention.

What is claimed is:

1. Fluorinated products resulting from the reaction of
(a) a molecule of at least one acid of the formula:

wherein A represents an aliphatic or aromatic hydrocarbon radical and n is a whole number from 1 to 4, and of
(b) one to five molecules of at least one compound possessing at least one ethylenic bond, at least one of said compounds corresponding to the formula:

wherein Rf represents a straight or branched perfluorinated chain containing from 1 to 20 carbon atoms, B represents a bivalent chaining which may be branched and which may comprise sulfur, oxygen or nitrogen atoms, one R represents a hydrogen atom and the other R represents a hydrogen atom or an alkyl group containing from 1 to 4 carbon atoms; and possibly neutralized or partially neutralized with an inorganic or organic base.

2. Fluorinated products in accordance with claim 1 wherein the acid of formula (I) is thioglycollic acid, thiosalicylic acid or thiomalic acid.

3. Fluorinated products in accordance with claim 2 wherein the base is an amino alcohol or an amine.

4. Fluorinated products in accordance with claim 2 wherein the base is ammonia.

5. Fluorinated products in accordance with claim 1 wherein the base is an amino alcohol or an amine.

6. Fluorinated products in accordance with claim 1 wherein the base is ammonia.

7. Fluorinated products in accordance with claims 1, 2, 3, 4, 5 or 6 wherein the compound of formula (II) is a compound of the formula:

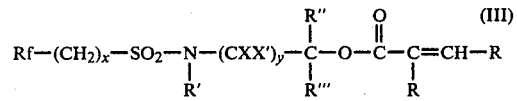

wherein Rf and R have the same significance as in claim 1, x is a whole number from 1 to 20, y is a whole number from 1 to 4, R' represents a hydrogen atom or an alkyl group containing from 1 to 10 carbon atoms, a cycloalkyl group containing from 5 to 12 carbon atoms, a hydroxyalkyl group containing from 2 to 4 carbon atoms, an aryl group or an aryl group substituted by an alkyl radical containing from 1 to 6 carbon atoms, R", R''', X and X' may be the same or different and represent hydrogen or alkyl groups containing from 1 to 4 carbon atoms.

8. Fluorinated products in accordance with claim 7 wherein the compound of formula (II) is a compound of the formula:

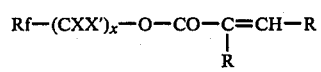

wherein Rf, X, X', x and R have the same significance as in claims 1 and 7.

9. Fluorinated products in accordance with claims 1, 2, 3, 4, 5 or 6 wherein the compound of formula (II) is a compound of the formula:

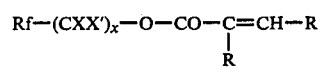

wherein Rf and R have the same significance as in claim 1, X and X' may be the same or different and represent hydrogen or alkyl groups containing from 1 to 4 carbon atoms and x is a whole number from 1 to 20.

10. Fluorinated products in accordance with claim 9 wherein the two R are hydrogen.

11. Fluorinated products in accordance with claim 8 wherein the two R are hydrogen.

12. Fluorinated products in accordance with claim 7 wherein the two R are hydrogen.

13. Fluorinated products in accordance with claims 1, 2, 3, 4, 5 or 6 wherein the two R are hydrogen.

14. Compositions for oilproofing, waterproofing treatment and conferring a resistance to aggressive products or to solvents, said compositions containing a product in accordance with claim 13.

15. Compositions for oilproofing, waterproofing treatment and conferring a resistance to aggressive products or to solvents, said compositions containing a product in accordance with claim 12.

16. Compositions for oilproofing, waterproofing treatment and conferring a resistance to aggressive products or to solvents, said compositions containing a product in accordance with claim 11.

17. Compositions for oilproofing, waterproofing treatment and conferring a resistance to aggressive products or to solvents, said compositions containing a product in accordance with claim 10.

18. Compositions for oilproofing, waterproofing treatment and conferring a resistance to aggressive products or to solvents, said compositions containing a product in accordance with claim 9.

19. Compositions for oilproofing, waterproofing treatment and conferring a resistance to aggressive products or to solvents, said compositions containing a product in accordance with claim 8.

20. Composition for oilproofing, waterproofing treatment and conferring a resistance to aggressive products or to solvents, said compositions containing a product in accordance with claim 7.

21. Compositions for oilproofing, waterproofing treatment and conferring a resistance to aggressive products or to solvents, said compositions containing a product in accordance with claims 1, 2, 3, 4, 5 or 6.

22. A method for the preparation of products in accordance with claim 13 which comprises telomerizing or cotelomerizing 1 to 5 molecules of at least one compound possessing at least one ethylenic bond, one of said compounds corresponding to formula (II) as defined in claim 1, with one molecule of at least one acid of formula (I) as defined in claim 1, in the presence of an ionic or radical catalyst and possibly neutralized or partially neutralized by an inorganic or organic base.

23. A method for the preparation of products in accordance with claim 12 which comprises telomerizing or cotelomerizing 1 to 5 molecules of at least one compound possessing at least one ethylenic bond, one of said compounds corresponding to formula (II) as defined in claim 1, with one molecule of at least one acid of formula (I) as defined in claim 1, in the presence of an ionic or radical catalyst and possibly neutralized or partially neutralized by an inorganic or organic base.

24. A method for the preparation of products in accordance with claim 11 which comprises telomerizing or cotelomerizing 1 to 5 molecules of at least one compound possessing at least one ethylenic bond, one of said compounds corresponding to formula (II) as defined in claim 1, with one molecule of at least one acid of formula (I) as defined in claim 1, in the presence of an ionic or radical catalyst and possibly neutralized or partially neutralized by an inorganic or organic base.

25. A method for the preparation of products in accordance with claim 10 which comprises telomerizing or cotelomerizing 1 to 5 molecules of at least one compound possessing at least one ethylenic bond, one of said compounds corresponding to formula (II) as defined in claim 1, with one molecule of at least one acid of formula (I) as defined in claim 1, in the presence of an ionic or radical catalyst and possibly neutralized or partially neutralized by an inorganic or organic base.

26. A method for the preparation of products in accordance with claim 9 which comprises telomerizing or cotelomerizing 1 to 5 molecules of at least one compound possessing at least one ethylenic bond, one of said compounds corresponding to formula (II) as defined in claim 1, with one molecule of at least one acid of formula (I) as defined in claim 1, in the presence of an ionic or radical catalyst and possibly neutralized or partially neutralized by an inorganic or organic base.

27. A method for the preparation of products in accordance with claim 8 which comprises telomerizing or cotelomerizing 1 to 5 molecules of at least one compound possessing at least one ethylenic bond, one of said compounds corresponding to formula (II) as defined in claim 1, with one molecule of at least one acid of formula (I) as defined in claim 1, in the presence of an ionic or radical catalyst and possibly neutralized or partially neutralized by an inorganic or organic base.

28. A method for the preparation of products in accordance with claim 7 which comprises telomerizing or cotelomerizing 1 to 5 molecules of at least one compound possessing at least one ethylenic bond, one of said compounds corresponding to formula (II) as defined in claim 1, with one molecule of at least one acid of formula (I) as defined in claim 1, in the presence of an ionic or radical catalyst and possibly neutralized or partially neutralized by an inorganic or organic base.

29. A method for the preparation of products in accordance with claims 1, 2, 3, 4, 5 or 6 which comprises telomerizing or cotelomerizing 1 to 5 molecules of at least one compound possessing at least one ethylenic bond, one of said compounds corresponding to formula (II) as defined in claim 1, with one molecule of at least one acid of formula (I) as defined in claim 1, in the presence of an ionic or radical catalyst and possibly neutralized or partially neutralized by an inorganic or organic base.

30. A method for the preparation of products in accordance with claim 13 which comprises condensing one molecule of at least one acid of formula (I) as defined in claim 1 with one molecule of an ethylenic compound of formula (II) as defined in claim 1 in the presence or absence of a basic catalyst and possibly neutralized or partially neutralized with an inorganic or organic base 31. A method for the preparation of products in accordance with claim 12 which comprises condensing one molecule of at least one acid of formula (I) as defined in claim 1 with one molecule of an ethylenic compound of formula (II) as defined in claim 1 in the presence or absence of a basic catalyst and possibly neutralized or partially neutralized with an inorganic or organic base.

32. A method for the preparation of products in accordance with claim 11 which comprises condensing one molecule of at least one acid of formula (I) as defined in claim 1 with one molecule of an ethylenic compound of formula (II) as defined in claim 1 in the presence or absence of a basic catalyst and possibly neutralized or partially neutralized with an inorganic or organic base 33. A method for the preparation of products in accordance with claim 10 which comprises condensing one molecule of at least one acid of formula (I) as defined in claim 1 with one molecule of an ethylenic compound of formula (II) as defined in claim 1 in the presence or absence of a basic catalyst and possibly neutralized or partially neutralized with an inorganic or organic base.

34. A method for the preparation of products in accordance with claim 9 which comprises condensing one molecule of at least one acid of formula (I) as defined in claim 1 with one molecule of an ethylenic compound of formula (II) as defined in claim 1 in the presence or absence of a basic catalyst and possibly neutralized or partially neutralized with an inorganic or organic base.

35. A method for the preparation of products in accordance with claim 8 which comprises condensing one molecule of at least one acid of formula (I) as defined in claim 1 with one molecule of an ethylenic compound of formula (II) as defined in claim 1 in the presence or absence of a basic catalyst and possibly neutralized or partially neutralized with an inorganic or organic base.

36. A method for the preparation of products in accordance with claim 7 which comprises condensing one molecule of at least one acid of formula (I) as defined in claim 1 with one molecule of an ethylenic compound of formula (II) as defined in claim 1 in the presence or absence of a basic catalyst and possibly neutralized or partially neutralized with an inorganic or organic base 37. A method for the preparation of products in accordance with claims 1, 2, 3, 4, 5 or 6 which comprises condensing one molecule of at least one acid of formula (I) as defined in claim 1 with one molecule of an ethylenic compound of formula (II) as defined in claim 1 in the presence or absence of a basic catalyst and possibly neutralized or partially neutralized with an inorganic or organic base.

38. A method in accordance with claim 37 which comprises using 0.01 to 5% of catalyst in relation to the weight of the ethylenic compounds engaged.

39. A method in accordance with claim 29 which comprises using 0.01 to 5% of catalyst in relation to the weight of the ethylenic compounds engaged.

40. A method in accordance with claim 38 which comprises carrying out the reaction at a pH between 2 and 11 inclusive and at a temperature between 40° and 120° C.

41. A method in accordance with claim 37 which comprises carrying out the reaction at a pH between 1 and 11 inclusive and at a temperature between 40° and 120° C.

42. A method in accordance with claim 29 which comprises carrying out the reaction at a pH between 2 and 11 inclusive and at a temperature between 40° and 120° C.

43. The process which comprises applying the compositions in accordance with claim 21 for the oilproofing and waterproofing of materials and in particular of papers, cardboards, woods, leathers, fabrics, metals, stoneware, glasses, porcelains, plastics and painted surfaces.

44. The process which comprises applying the products in accordance with claim 13 for the oilproofing and waterproofing of materials and in particular of papers, cardboards, woods, leathers, fabrics, metals, stoneware, glasses, porcelains, plastics and painted surfaces.

45. The process which comprises applying the products in accordance with claim 9 for the oilproofing and waterproofing of materials and in particular of papers, cardboards, woods, leathers, fabrics, metals, stoneware, glasses, porcelains, plastics and painted surfaces.

46. The process which comprises applying the products in accordance with claim 8 for the oilproofing and waterproofing of materials and in particular of papers, cardboards, woods, leathers, fabrics, metals, stoneware, glasses, porcelains, plastics and painted surfaces.

47. The process which comprises applying the products in accordance with claim 7 for the oilproofing and waterproofing of materials and in particular of papers, cardboards, woods, leathers, fabrics, metals, stoneware, glasses, porcelains, plastics and painted surfaces.

48. The process which comprises applying the products in accordance with claim 1 for the oilproofing and waterproofing of materials and in particular of papers, cardboards, woods, leathers, fabrics, metals, stoneware, glasses, porcelains, plastics and painted surfaces.

49. Materials and articles treated by means of a composition in accordance with claim 21.

50. Materials and articles treated by means of a product in accordance with claim 13.

51. Materials and articles treated by means of a product in accordance with claim 9.

52. Materials and articles treated by means of a product in accordance with claim 8.

53. Materials and articles treated by means of a product in accordance with claim 7.

54. Materials and articles treated by means of a product in accordance with claim 1.

* * * * *